United States Patent
Jiang et al.

(10) Patent No.: US 12,537,448 B2
(45) Date of Patent: Jan. 27, 2026

(54) CONTROL METHOD AND CONTROL CIRCUIT FOR SWITCHED-MODE POWER SUPPLY WITH A POWER TRANSISTOR AND AN INDUCTOR, AND CONTROL CHIP

(71) Applicant: SHANGHAI BRIGHT POWER SEMICONDUCTOR CO., LTD., Shanghai (CN)

(72) Inventors: Rulong Jiang, Shanghai (CN); Zhen Zhu, Shanghai (CN); Xiaoru Gao, Shanghai (CN); Zongyuan He, Shanghai (CN); Yanlei Wei, Shanghai (CN); Shuaimin Yan, Shanghai (CN); Yuqi Peng, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 278 days.

(21) Appl. No.: 18/471,765

(22) Filed: Sep. 21, 2023

(65) Prior Publication Data

US 2024/0154518 A1    May 9, 2024

(30) Foreign Application Priority Data

Nov. 3, 2022 (CN) .......................... 202211369056.5

(51) Int. Cl.
*H02M 3/156* (2006.01)
*H02M 1/08* (2006.01)
*H02M 1/36* (2007.01)

(52) U.S. Cl.
CPC ............. *H02M 3/156* (2013.01); *H02M 1/08* (2013.01); *H02M 1/36* (2013.01)

(58) Field of Classification Search
CPC .......... H02M 1/36; H02M 3/156; H02M 1/08; H02M 1/0041
See application file for complete search history.

(56) References Cited

U.S. PATENT DOCUMENTS

| | | | | |
|---|---|---|---|---|
| 9,024,613 | B2* | 5/2015 | Murata | H02M 3/156 323/285 |
| 10,044,271 | B1* | 8/2018 | Assaad | H03K 4/06 |
| 2004/0113600 | A1* | 6/2004 | Hoshino | H02M 3/156 323/284 |
| 2012/0182003 | A1* | 7/2012 | Flaibani | H02M 3/156 323/284 |
| 2016/0294282 | A1* | 10/2016 | Herfurth | H05B 45/375 |

(Continued)

*Primary Examiner* — Gustavo A Rosario-Benitez
(74) *Attorney, Agent, or Firm* — MUNCY, GEISSLER, OLDS & LOWE, P.C.

(57) ABSTRACT

A control method and control circuit for a switched-mode power supply (SMPS) and a control chip are disclosed. The SMPS is switched between different operating modes based on different levels of its output voltage. When the output voltage is lower than a first reference and the difference between it and the first reference exceeds a threshold, an operating frequency of a power transistor and output voltage are controlled to satisfy a proportional relationship defined by an associated slope. When the output voltage is lower than the first reference and the difference between it and the first reference is below the threshold, the power transistor is controlled to operate at a fixed frequency. When the output voltage is higher than the first reference, the power transistor is controlled to operate at a variable frequency.

17 Claims, 3 Drawing Sheets

(56) References Cited

U.S. PATENT DOCUMENTS

| | | | |
|---|---|---|---|
| 2016/0380537 A1* | 12/2016 | Bizjak | H02M 1/36 |
| | | | 323/271 |
| 2017/0070149 A1* | 3/2017 | Guan | H02M 1/36 |
| 2017/0079104 A1* | 3/2017 | Li | H02M 1/088 |
| 2018/0123581 A1* | 5/2018 | Chiu | H03K 17/166 |
| 2018/0248479 A1* | 8/2018 | Fan | H02M 5/458 |
| 2019/0245431 A1* | 8/2019 | Chung | H02M 3/156 |
| 2019/0271998 A1* | 9/2019 | Sisson | G05F 1/468 |
| 2021/0399637 A1* | 12/2021 | Guan | H02M 1/327 |
| 2023/0238883 A1* | 7/2023 | Hsieh | H02M 3/158 |
| | | | 323/282 |
| 2024/0421691 A1* | 12/2024 | Brambilla | H02M 3/1588 |
| 2025/0007403 A1* | 1/2025 | Brambilla | H02M 3/158 |
| 2025/0047205 A1* | 2/2025 | Takobe | H02M 1/36 |

* cited by examiner

CONTROL METHOD AND CONTROL CIRCUIT FOR SWITCHED-MODE POWER SUPPLY WITH A POWER TRANSISTOR AND AN INDUCTOR, AND CONTROL CHIP

CROSS-REFERENCE TO RELATED APPLICATION

This application claims the priority of Chinese patent application number 202211369056.5, filed on Nov. 3, 2022, the entire contents of which are incorporated herein by reference.

TECHNICAL FIELD

The present invention relates to the field of switched-mode power supply (SMPS) control technology and, in particular, to a control method and control circuit for an SMPS and a control chip.

BACKGROUND

FIG. 1 is a schematic diagram showing the structure of an AC/DC SMPS system of a high-side buck topology without a VCC capacitor. When a power transistor Q in an associated control chip IC is turned on, a path between a drain pin DRAIN (PIN1) and a ground pin GND (PIN3) is conducted. As a result, a bus voltage Vindc is applied to one end of an inductor L, and an output voltage Vo is provided at the other end of the inductor L. An inductor current IL increases at a rate of (Vindc−Vo)/L over a time period known as an on-time Ton. When the power transistor Q is turned off, as the inductor current IL cannot change abruptly, a freewheeling diode DO is turned on, resulting in a voltage drop of −Vo across the inductor L. The inductor current IL decreases at a rate of Vo/L over a time period known as a demagnetization time Toff.

As can be seen from the above expressions regarding the inductor current IL, when the output voltage Vo is very low, the inductor current IL will decrease at a very small rate over the Toff period. Since the SMPS system typically requires a minimum on-time Tonmin, under an output short circuit condition or during start-up, the SMPS often operates at a maximum permissible frequency, which corresponds to a short Toff period, a very low output voltage Vo and slow demagnetization of the inductor current IL. Due to the required minimum on-time Tonmin, in each switching period of the power transistor Q, an increase in the inductor current IL over the on-time Tonmin surpasses a decrease in the inductor current IL over the demagnetization time Toff. This tends to cause an incrementally increasing peak value of the inductor current. In particular, in case of a high input voltage, there is a risk of the peak current value accumulating to an uncontrolled level.

A peak current value detection resistor Rcs (not shown) may be added to sense the peak current value IPK, where when the peak current value causes a voltage drop of Vfb across the detection resistor Rcs, it can be expressed as Vfb/Rcs. FIG. 2 shows a method for preventing an excessive accumulation of the peak current value according to prior art. As can be seen from FIG. 2, during start-up or under an output short circuit condition, if the peak current value IPK (Vfb/Rcs) accumulates, then when it is detected that the peak current value IPK reaches a preset value (V_CLK_DOWN/Rcs, which is usually set to be greater than a maximum peak current value ILIM for normal operation of the system, i.e., V_ILIM/Rcs), the system's operating frequency is lowered to avoid any further incremental increase of the peak current value IPK. Although this method can mitigate the above problem to some extent, it is associated with the following shortcomings. Firstly, after the operating frequency is lowered, a maximum peak current value V_CLK_DOWN/Rcs remains greater than the maximum value ILIM for normal operation of the system. This requires the inductor, the transformer, the power transistor and the like to withstand greater saturation currents, thus leading to unnecessary capabilities and size of the power transistor and the like. Secondly, different desired output voltages typically require different reductions in the operating frequency. Improper designs may cause the problem of start-up with heavy load or that the peak current value still incrementally increases in a certain output voltage range.

SUMMARY OF THE INVENTION

It is an object of the present invention to provide a control method and control circuit for an SMPS and a control chip, which can avoid accumulation of a peak current value during start-up or under an output short circuit condition of the SMPS while ensuring good start-up capability thereof.

To this end, the present invention provides a control method for a switched-mode power supply. The switched-mode power supply comprises a power transistor and an inductor coupled to the power transistor. The switched-mode power supply receives an input voltage and generates an output voltage. The control method comprises:
 detecting the output voltage and comparing the output voltage with a first reference, wherein:
  i) configuring the switched-mode power supply to operate in a first operating mode when the output voltage is lower than the first reference and a difference between the output voltage and the first reference is above a threshold;
  ii) configuring the switched-mode power supply to operate in a second operating mode when the output voltage is lower than the first reference and the difference is below the threshold; and
  iii) configuring the switched-mode power supply to operate in a third operating mode when the output voltage is higher than the first reference, wherein:
  in the first operating mode, a first operating mode slope is derived from a plurality of system parameters of the switched-mode power supply, and an operating frequency of the power transistor and the output voltage are controlled to satisfy a proportional relationship according to the first operating mode slope; in the second operating mode, the power transistor is controlled to operate at a fixed frequency; and in the third operating mode, the power transistor is controlled to operate at a variable frequency.

Optionally, the control method may further comprise: deriving a curve of an operating frequency versus the output voltage from a first set of the system parameters of the switched-mode power supply, based on a situation where the switched-mode power supplies provide a constant output current, wherein the curve has a first slope, and wherein the first set of the system parameters includes a current variation in the power transistor, the input voltage and an inductance of the inductor.

Optionally, the control method may further comprise: deriving a curve of the operating frequency versus the output voltage from a second set of the system parameters of the switched-mode power supply, based on a situation where a peak current value of the switched-mode power supply is prevented from accumulating, wherein the curve has a second slope, and wherein the second set of the system parameters includes a minimum on-time of the power transistor, the input voltage and an inductance of the inductor.

Optionally, the first operating mode slope may be greater than the first slope.

Optionally, the first operating mode slope may be smaller than the second slope.

Optionally, the control method may further comprise: in the second operating mode, controlling the power transistor to operate at a maximum operating frequency.

Based on the same inventive concept, the present invention also provides a control circuit for a switched-mode power supply. The switched-mode power supply comprises a power transistor and an inductor coupled to the power transistor. The switched-mode power supply receives an input voltage and generates an output voltage.

The control circuit comprises: a first control branch to receive a feedback signal reflecting the output voltage and a first reference; and a second control branch to receive the feedback signal and a second reference, wherein:
  i) when the feedback signal is higher than the first reference, the first control branch operates to enable the power transistor to operate at a variable frequency;
  ii) when the feedback signal is lower than the first reference and a difference between the feedback signal and the first reference is below a threshold, the first control branch and the second control branch operates to enable the power transistor to operate at a fixed frequency; and
  iii) when the feedback signal is lower than the first reference and the difference is above the threshold, the second control branch controls an operating frequency of the power transistor and the output voltage to satisfy a proportional relationship,
  the proportional relationship derived from a plurality of system parameters of the switched-mode power supply.

Optionally, the first control branch may comprise an error amplifier, configured to: receive the first reference at its positive input terminal, receive feedback signal at its negative input terminal; and output a compensation signal.

Optionally, the first control branch may further comprise a first transconductance amplifier coupled to the error amplifier to receive the compensation signal, the first transconductance amplifier further receiving a third reference and generating a first current based on the compensation signal and the third reference.

Optionally, the second control branch may comprise a second transconductance amplifier configured to: receive the feedback signal and the second reference; and generate a second current based on the feedback signal and the second reference.

Optionally, the control circuit may further comprise a current source and a current mirror, wherein the current mirror is coupled to the current source and receives the first current or the second current, and wherein the current mirror outputs a control current which determines the operating frequency of the power transistor in the switched-mode power supply.

Optionally, the control circuit may control a clock frequency based on the control current and generate a control signal based on the clock frequency, the control signal indicating an action to be taken by the power transistor and determining the operating frequency of the power transistor.

Based on the same inventive concept, the present invention also provides a control chip comprising the control circuit described herein.

Optionally, the control chip may further comprise:
  a feedback pin coupled to an output voltage terminal of the switched-mode power supply;
  an input pin coupled to a first end of the power transistor;
  a ground pin coupled to a second end of the power transistor,
  wherein the power transistor is embedded in the control chip, and wherein the power transistor is coupled to, and controlled by, the control circuit.

Optionally, the control chip may further comprise a sampling circuit, which is coupled to the feedback pin and embedded in the control chip.

Optionally, the control chip may be connected to an external sampling circuit, which is coupled between the output voltage terminal of the switched-mode power supply and the feedback pin.

Compared with the prior art, the present invention has at least one of the following benefits:

1. The switched-mode power supply is switched between different operating modes based on different levels of its output voltage. Specifically, when the output voltage is lower than a first reference and the difference between the output voltage and the first reference is above a threshold, the switched-mode power supply operates in a first operating mode, in which the operating frequency of the power transistor and the output voltage are controlled to satisfy a proportional relationship defined by an associated slope. When the output voltage is lower than the first reference and the difference between the output voltage and the first reference is below the threshold, the switched-mode power supply operates in a second operating mode, in which the power transistor is controlled to operate at a fixed frequency. When the output voltage is higher than the first reference, the switched-mode power supply operates in a third operating mode, in which the power transistor is controlled to operate at a variable frequency. In this way, under an output short circuit condition or during a start-up process, a peak current value is prevented from accumulating to an unexpected level, providing protection to the power transistor, the inductor and other components while ensuring good start-up capacity of the SMPS.

2. At the same peak current value, the power transistor and the inductor are allowed to have smaller saturation currents, resulting in cost savings for the system and area savings for the control circuit.

BRIEF DESCRIPTION OF THE DRAWINGS

Those of ordinary skill in the art would appreciate that the accompanying drawings are provided to facilitate a better understanding of the present invention and do not limit the scope thereof in any sense, in which.

DETAILED DESCRIPTION

Figure 1:
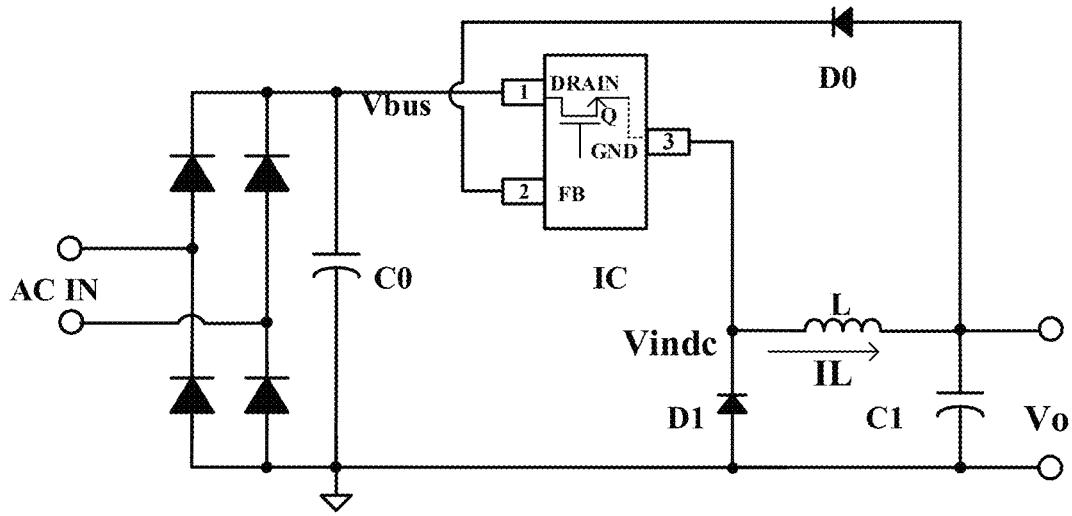
FIG. 1 is a schematic diagram showing the structure of an AC/DC SMPS system of a high-side buck topology without a VCC capacitor.
Figure 2:
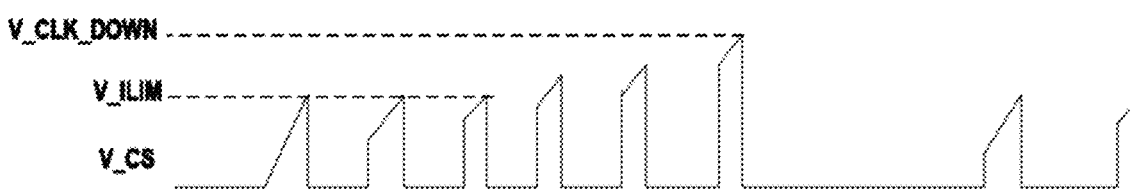
FIG. 2 schematically illustrates a current detection signal in a method for preventing excessive accumulation of the peak current value.

The following description sets forth numerous specific details in order to provide a more thorough understanding of the present invention. However, it will be apparent to those skilled in the art that the present invention can be practiced without one or more of these specific details. In other instances, well-known technical features have not been described in order to avoid unnecessary obscuring of the invention. It is to be understood that the invention may be embodied in many different forms and should not be construed as being limited to the embodiments set forth below. Rather, these embodiments are provided so that this disclosure is thorough and conveys the scope of the invention to those skilled in the art. In the drawings, similar reference numerals refer to similar elements throughout. It will be understood that when an element is referred to as being "connected to" or "coupled to" another element, it can be directly connected or coupled to the other element, or intervening elements may also be present. In contrast, when an element is referred to as being "directly connected to" another element, there are no intervening elements. As used herein, the singular forms "a", "an" and "the" are intended to include the plural forms as well, unless the context clearly indicates otherwise. It will be further understood that the term "comprising" specifies the presence of stated features, steps, operations, elements, and/or components, but do not preclude the presence or addition of one or more other features, steps, operations, elements, components, and/or groups thereof. As used herein, the term "and/or" includes any and all combinations of the associated listed items.

The present invention will be described in greater detail below with reference to the accompanying drawings by way of specific embodiments. From the following description, advantages and features of the present invention will become more apparent. Note that the figures are provided in a very simplified form not necessarily drawn to exact scale and for the only purpose of facilitating easy and clear description of the disclosed embodiments.

As discussed in the Background section, in control of an AC/DC or DC/DC SMPS of any of various topologies such as buck, boost or buck-boost, when under an output short circuit condition or during start-up, an output voltage Vo will be very low, and demagnetization of an inductor current IL will be slow. However, the SMPS tends to operate at a maximum frequency, which corresponds to a short Toff period. Because of the minimum on-time Tonmin, in each switching period of the power transistor Q, an increase in the inductor current IL over the on-time Tonmin surpasses a decrease in the inductor current IL over the demagnetization time Toff. As a consequence, a peak value of the inductor current tends to accumulate. In particular, in case of a high input voltage, there is a risk of the peak current value accumulating to an uncontrolled level.

To overcome this problem and ensure successful start-up of an SMPS system, the present invention provides a method, in which throughout a start-up process from the beginning to a constant-voltage output being attained, the SMPS is switched between different operating modes depending on its output voltage. This enables the SMPS to have satisfactory output current capability, while ensuring that an inductor current therein will not accumulate even in operation with the minimum possible on-time. In this way, a peak current value will not accumulate to an unexpected level under an output short circuit condition or during start-up, thereby providing protection to components such as a power transistor and an inductor while ensuring good start-up capability of the SMPS.

Figure 4:
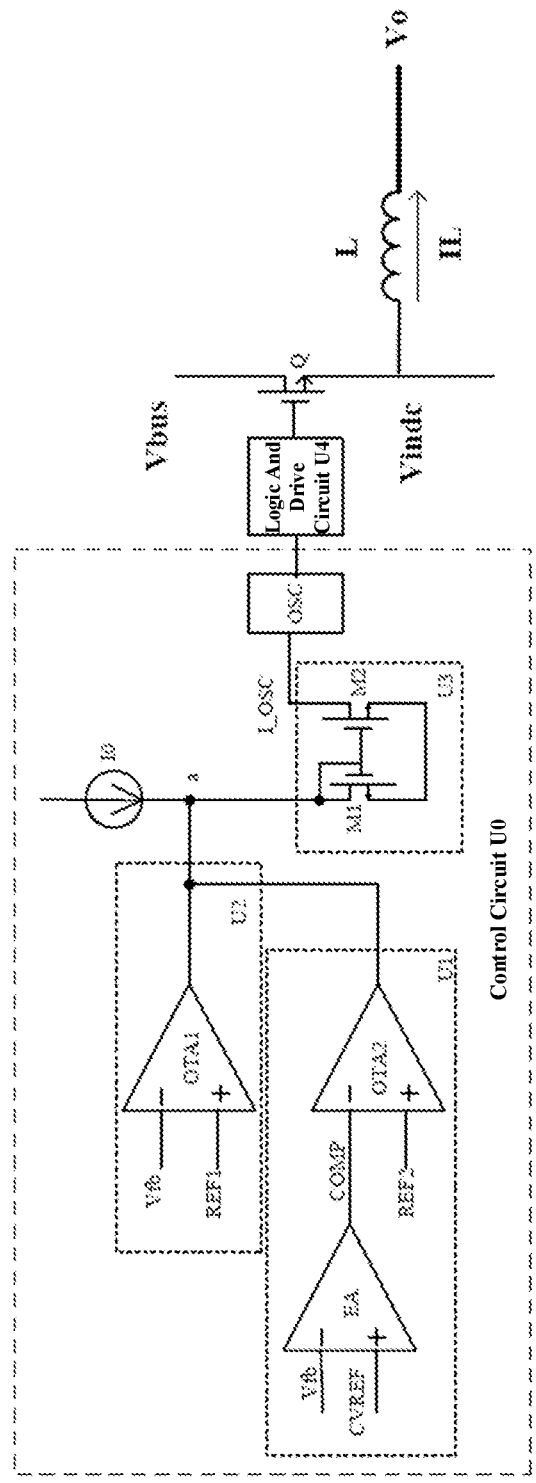
FIG. 4 is a schematic diagram showing the structure of a control circuit for an SMPS according to a specific embodiment of the present invention.

Specifically, in an embodiment of the present invention, there is provided a control method for an SMPS including a power transistor and an inductor coupled to the power transistor. It receives an input voltage and generates an output voltage. As an example, the SMPS is a high-side buck SMPS without a VCC capacitor. Referring to FIGS. 1 and 4, when a power transistor Q in a control chip IC of the SMPS is turned on, a current path between a drain pin DRAIN (PIN1) and a ground pin GND (PIN3) is conducted. As a result, the input voltage Vindc is applied to one end of the inductor L, and the output voltage Vo is provided at the other end of the inductor L. In the SMPS system, the power transistor Q requires a minimum on-time Tonmin. Moreover, a maximum permissible peak current value for normal operation of the system is defined as ILIM, and the power transistor Q has a switching period T=Ton+Toff, where Ton is the on-time of the power transistor Q and Toff is the demagnetization time of the power transistor Q as described in the Background section.

The SMPS may operate either in a continuous conduction mode (CCM) or in a discontinuous conduction mode (DCM), depending on a minimum value of a current IL flowing through the inductor L. If the power transistor Q switches on before the inductor current IL drops to zero, then the current IL flowing through the inductor L is always greater than zero, i.e., the SMPS is operating in the CCM mode. If Toff lasts long enough to allow the inductor current IL to drop to zero, then the inductor current IL will be zero over a period of time, in which both a diode DO and the power transistor Q are turned off. That is, the SMPS is operating in the DCM mode.

Referring to FIG. 4, the control method for the SMPS in this embodiment in particular includes the steps as follows.

S1: acquiring a voltage signal Vfb reflecting the output voltage Vo of the SMPS by detecting the output voltage, and comparing the voltage signal Vfb with a first reference CVREF. It would be appreciated that the voltage signal Vfb may exactly reflect the output voltage Vo at a ratio of 1:1, or be otherwise proportional to the output voltage Vo. In the latter case, the first reference CVREF should be adjusted based on the proportion. Additionally, the voltage signal Vfb may be replaced with a current signal or the like, depending on the requirements of the circuit design. For clarity of description, the following description is set forth in the context of the output voltage Vo itself representing the signal obtained by detecting the output voltage Vo in step S1.

S2: if the output voltage Vo is lower than the first reference CVREF and the difference between the output voltage Vo and the first reference CVREF is above a threshold, the SMPS operates in a first operating mode, in which a slope K is derived from multiple system parameters of the SMPS, and an operating frequency f of the power transistor Q varies proportionally to the output voltage Vo according to the slope K.

S3: if the output voltage Vo is lower than the first reference CVREF and the difference between the output voltage Vo and the first reference CVREF is below the threshold, the SMPS operates in a second operating mode, in which the power transistor Q operates at a fixed frequency.

S4: if the output voltage Vo is higher than the first reference CVREF, cause the SMPS to operate in a third operating mode, in which the power transistor Q operates at a variable frequency.

Referring to FIG. 1 and FIG. 4, in step S1, an associated sampling circuit (e.g., the branch comprising the diode shown in FIG. 1) may sample the output voltage Vo and thereby obtain a sampled voltage Vfb reflecting variation of the SMPS output voltage Vo. Moreover, the sampled voltage Vfb may be compared with a first reference CVREF.

Figure 3:
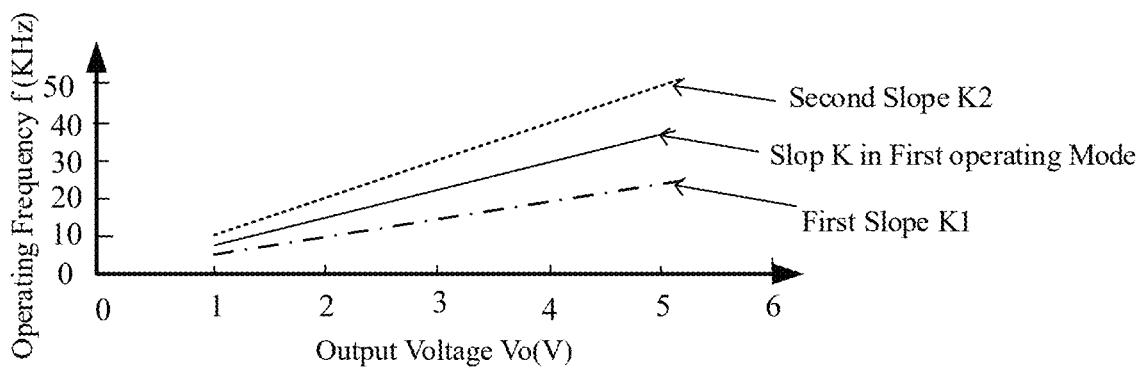
FIG. 3 is a schematic diagram showing a relationship between an f (operating frequency) and Vo (output voltage) for a first operating mode in a control method for an SMPS according to a specific embodiment of the present invention.

In step S2, if the output voltage Vo is lower than the first reference CVREF and the difference between the output voltage Vo and the first reference CVREF is above a threshold, a compensation signal COMP output from an error amplifier EA is saturated, thus a switching frequency is controlled by a transconductance amplifier OTA1. Specifically, from a first set of system parameters of the SMPS, a curve of an operating frequency f vs. output voltage Vo (referred to as a first reference curve herein), f=K1*Vo, may be plotted, based on a situation where the SMPS to provide a constant output current. As shown in FIG. 3, this curve has a first slope K1. The first set of system parameters may include current variation in the power transistor Q (or variation of the inductor current IL), the input voltage Vindc and the inductance of the inductor L. Further, from a second set of system parameters of the SMPS, another curve of operating frequency f vs. output voltage Vo (referred to as a second reference curve herein), f=K2*Vo, may be plotted, based on a situation where a peak current value is prevented from accumulating in the SMPS. As shown in FIG. 3, this curve has a second slope K2. The second set of system parameters may include the minimum on-time Tonmin of the power transistor Q, the input voltage Vindc, the inductance of the inductor L and other system parameters of the SMPS.

A constant-output-voltage operating mode requires a constant output current. For the CCM mode, an initial value IPK_Start of the inductor current must be constant (this value is constant for the DCM mode, as it is always zero). Therefore, the curve of the operating frequency f vs. output voltage Vo that allows the SMPS to provide a constant output current can be derived as follows:

Toff=(ILIM−IPK_Start)*L/Vo;
Ton=(ILIM−IPK_Start)*L/(Vindc−Vo);
giving  T=Ton+Toff=(ILIM−IPK_Start)*L[1/(Vindc−Vo)+1/Vo].

From these equations, the first reference curve can be obtained as f=1/T=K1*Vo*(Vindc−Vo)/Vindc, where K1 is the first slope, and K1=1/(ILIM−IPK_Start). (ILIM−IPK_Start) represents the current variation in the power transistor Q (or the variation of the inductor current IL), and its average value can be represented as an output current value.

Optionally, when Vindc is higher than Vo by one or more orders of magnitude (e.g., Vindc is 100 V or higher, while Vo is 10 V or lower). The equation of the first reference curve may be approximated as f=K1*Vo. That is, the first reference curve represents a proportional relationship of the operating frequency and the output voltage based on a situation where the SMPS provides a constant output current. According to this, K1 can be calculated according to required start-up capability with load (i.e., minimum output current) of the SMPS.

Further, in order to avoid a peak current value from accumulating during start-up of the SMPS, Tonmin*Vindc/L≤(T−Tonmin)*Vo/L must be satisfied. When the output voltage Vo fails to reach a desired constant voltage value, the peak current value IPK will remain at the maximum value ILIM. Considering the most demanding applications, at a maximum input voltage and a fixed minimum on-time, the curve of the operating frequency f vs. output voltage Vo that avoids a peak current value in the SMPS from accumulating may be obtained, thus the corresponding K2 maybe calculated.

Accordingly, in step S2, when the SMPS operates in the first operating mode, the operating frequency f and the output voltage Vo are further controlled to satisfy a proportional relationship according to a slope K, wherein K1<K<K2. That is, in step S2, when the SMPS operates in the first operating mode, simply by controlling the curve of the operating frequency f vs. the output voltage Vo of the power transistor Q to lie between the first and second reference curves, sufficient output current capability during start-up of the SMPS can be ensured, and an accumulation of peak current value can be prevented during start-up or under an output short circuit condition.

In step S3, Vo increases so that, while Vfb remains lower than CVREF, the difference between them is below the aforementioned threshold. Responsively, the SMPS enters the second operating mode, and the power transistor Q is controlled to operate at a fixed frequency. Preferably, in the second operating mode of the SMPS, the power transistor Q is controlled to operate constantly at a maximum operating frequency, in order to reach a desired maximum peak current value as soon as possible.

In step S4, Vo further increases so that Vfb rises above the first reference CVREF. Responsively, the SMPS enters the third operating mode, in which the power transistor Q is controlled to operate at a variable frequency, which results in a constant output voltage or current and avoids any further accumulation of the peak current value. In order to avoid the problem of heavy load start-up or the peak current value still accumulates in a certain output voltage range, in step S3, the operating frequency of the power transistor Q is adjusted by an amount determined according to a desired output voltage.

Referring to FIG. 4, in an embodiment of the present invention, a control circuit U0 is implemented to control an SMPS as described herein. The SMPS includes a power transistor Q and an inductor L. The SMPS receives an input voltage Vbus and generates an output voltage Vo. The control circuit U0 includes a first control branch U1 and a second control branch U2. The first control branch U1 receives a feedback signal of the output voltage Vo and a first reference CVREF. The feedback signal is a voltage Vfb obtained by sampling the output voltage Vo, which reflects variation of the output voltage Vo. The second control branch U2 receives the feedback signal and a second reference REF1. When the feedback signal is higher than the first reference CVREF, the first control branch U1 causes the power transistor Q to operate at a variable frequency. When the feedback signal Vfb is lower than the first reference CVREF and the difference between the feedback signal Vfb and the first reference CVREF is lower than a threshold, the first control branch U1 and the second control branch U2 work together to operate the power transistor Q at a fixed frequency. When the feedback signal Vfb is lower than the first reference CVREF and the difference is above the threshold, the second control branch U2 controls the operating frequency f of the power transistor Q to be proportional to the output voltage Vo, and the proportional relationship can be derived from multiple system parameters of the SMPS.

As an example, the first control branch U1 includes an error amplifier EA and a first transconductance amplifier OTA1, and the second control branch U2 includes a second transconductance amplifier OTA2. In this embodiment, the control circuit U0 further includes a current source I0, a current mirror U3, an oscillator OSC and a logic and drive circuit U4.

The error amplifier EA receives the first reference CVREF at its positive input terminal "+" and the feedback signal Vfb at its negative input terminal "−", and outputs a compensation signal COMP. A first input terminal of the first transconductance amplifier OTA1 receives the feedback signal Vfb, and a second input terminal of the first transconductance amplifier OTA1 receives the second reference REF1. A first input terminal of the second transconductance amplifier OTA2 is coupled to an output terminal of the error amplifier EA and receives the compensation signal COMP, and a second input terminal thereof receives a third reference REF2. An output terminal of the current source I0 and an input terminal of the current mirror U3 are coupled to each other at a node a, to which an output terminal of the first transconductance amplifier OTA1 and an output terminal of the second transconductance amplifier OTA2 are both coupled. An output terminal of the current mirror U3 is coupled to one end of the oscillator OSC, and the other end of the oscillator OSC is coupled to the logic and drive circuit U4, which is in turn coupled to a gate of the power transistor Q. The first transconductance amplifier OTA1 generates a second current I2 based on the feedback signal Vfb and the second reference REF1. The second transconductance amplifier OTA2 generates a first current I1 based on the compensation signal COMP and the third reference REF2. The current mirror U3 outputs, based on an output current of the current source I0 and the first current I1 or second current I2, a control current I_OSC for determining the operating frequency f of the SMPS (e.g., in case of the transconductance amplifiers OTA1 and OTA2 outputting pull-down currents, the control current I_OSC may indicate the difference between the output current from the current source I0 and the first current I1 or second current I2). The oscillator OSC outputs, based on the control current I_OSC, an oscillation signal (not shown) with a corresponding clock frequency to the logic and drive circuit U4, and the logic and drive circuit U4 then generates a control signal (not shown) based on the oscillation signal with the corresponding clock frequency. The control signal indicates an action to be taken by the power transistor Q (i.e., turn-on or turn-off) and drives it to perform the action. Moreover, it determines the operating frequency f of the power transistor Q. In other words, the control current I_OSC output from the current mirror U3 determines the clock frequency of the oscillation signal output from the oscillator OSC, which determines a period of the control signal output from the logic and drive circuit U4 and hence the switching period of the power transistor Q.

It would be appreciated that the current mirror U3 functions to output the control current I_OSC for the oscillator OSC proportionally to a current present at the node a. The transition may occur at a ratio of 1:1, 1:n, n:1 or the like, and the present invention is not particularly limited in this regard. That is, the current mirror U3 in this embodiment may be implemented as any suitable circuit structure. For example, the current mirror U3 may include mirrored MOS transistors M1 and M2. Serving as the input terminal of the current mirror U3, a drain of M1 is connected to a gate of M1, a gate of M2 and the node a. A drain of M2 serves as the output terminal of the current mirror U3 and is connected to the oscillator OSC. The transition ratio of the current mirror U3 is determined by parameters of M1 and M2.

In this embodiment, referring to FIGS. 1 and 4, the first input terminal "−" of the error amplifier EA is coupled to an output terminal of an associated sampling circuit (e.g., the branch incorporating the diode D0 shown in FIG. 1) and receives the voltage Vfb (i.e., the feedback signal) obtained by the sampling circuit through sampling the output voltage Vo of the SMPS. The second input terminal "+" of the error amplifier EA receives the constant voltage reference CVREF. The error amplifier EA is configured to amplify the difference between the sampled voltage Vfb and the constant voltage reference CVREF and output it as the compensation signal COMP. A lower Vfb signal level results in a higher COMP signal level. Because of a large gain of the error amplifier EA, the output voltage Vo is relatively low (increases from 0) at an initial stage of the start-up process, clamping the compensation signal COMP at its maximum value. An output signal of the first control branch is kept constant, and frequency control in the SMPS system is conducted by the second control branch U2. As the start-up process proceeds, Vfb gradually increases. Operation of the control circuit U0 in this embodiment over a start-up process is described below.

At an initial stage, the sampled voltage Vfb is much lower than the first reference CVREF (i.e., the difference between them is the greatest), the compensation signal COMP output from the error amplifier EA is set to the maximum value. At this time, the compensation signal COMP from the error amplifier EA is higher than the third reference REF2, and the SMPS therefore operates in the first operating mode, in which the first transconductance amplifier OTA1 draws a current, whist the second transconductance amplifier OTA2 does not (i.e., the second current I2=0). As a result, I_OSC=I0−I1, and I1 is proportional to the difference between Vfb and REF1. Thus, in actual operation of the SMPS in the first operating mode, the operating frequency f of the power transistor Q increases with the output voltage Vo. That is, the lower the output voltage Vo, the lower the operating frequency f; the higher the output voltage Vo, the higher the operating frequency f. A gain of the transconductance amplifier OTA1 is designed so that, variation curve of the operating frequency f of the power transistor Q in the first operating mode with the output voltage Vo satisfies the slope as discussed above. That is, a curve of an operating frequency f vs. output voltage Vo during operation of the SMPS is maintained above the first reference curve (i.e., the curve of the operating frequency f vs. output voltage Vo that enables the SMPS to meet the minimum current output capability requirement) and below the second reference curve (i.e., the curve of the operating frequency f vs. output voltage Vo that can prevent a peak current value from accumulating). In this way, the system will have satisfactory load start-up capability, while being able to prevent a peak current value from accumulating.

When the output voltage Vo gradually increases to approach or reach a desired constant value, the sampled voltage Vfb will be lower than the first reference CVREF, and the compensation signal COMP output from the error amplifier EA will be lower than the second reference voltage REF2. At this time, Vfb is slightly higher than REF1, and the SMPS instead operates in the second operating mode, in which neither of the first transconductance amplifier OTA1 nor the second transconductance amplifier OTA2 draws a current. As a result, I_OSC=I0, and the power transistor Q operates at a fixed frequency, which is, for example, the maximum frequency. The second reference REF1 is slightly lower than the first reference CVREF. This can ensure that the first transconductance amplifier OTA1 and the second transconductance amplifier OTA2 function in different operating modes.

When the output voltage Vo further increases, Vfb will rise above the first reference CVREF, and COMP will further decrease. In response, the SMPS will operate in the third operating mode, in which the second transconductance amplifier OTA2 draws a current from the node a, reducing a current in the current mirror and hence the current I_OSC. As a result, the actual operating frequency f and power of the SMPS are reduced so that the output voltage, and hence the output current, of the SMPS is maintained constant. At this time, the system operates in a pulse frequency modulation (PFM) mode, in which I_OSC=I0−I2, and I2 is proportional to the difference between COMP and REF2.

According to this embodiment, in the third operating mode, the frequency control circuit actually adjusts the operating frequency f of the power transistor Q in the SMPS based on the sampled voltage Vfb of the output voltage Vo (as a variant) and the differences between the sampled voltage Vfb and multiple reference values. As such, during start-up of the system, although COMP is at its highest value and the first control branch operates in an open-loop mode, the operating frequency f of the SMPS can increase with the output voltage Vo, thereby preventing the peak current value from accumulating to an excessive level in the start-up process. In this way, the curve of an operating frequency f vs. output voltage Vo in actual operation of the SMPS can be limited below the first reference curve (i.e., the curve of the operating frequency f vs. output voltage Vo that prevents a peak current value from accumulating in the worst case). Meanwhile, during constant-current constant-voltage operation, the system's operating frequency f is modulated based only on COMP that is an amplification of the difference between the sampled voltage Vfb and the constant voltage reference CVREF.

Based on the same inventive concept, referring to FIGS. 1 and 4, in an embodiment of the present invention, there is provided control chip IC including the control circuit U0 described above.

Figure 5:
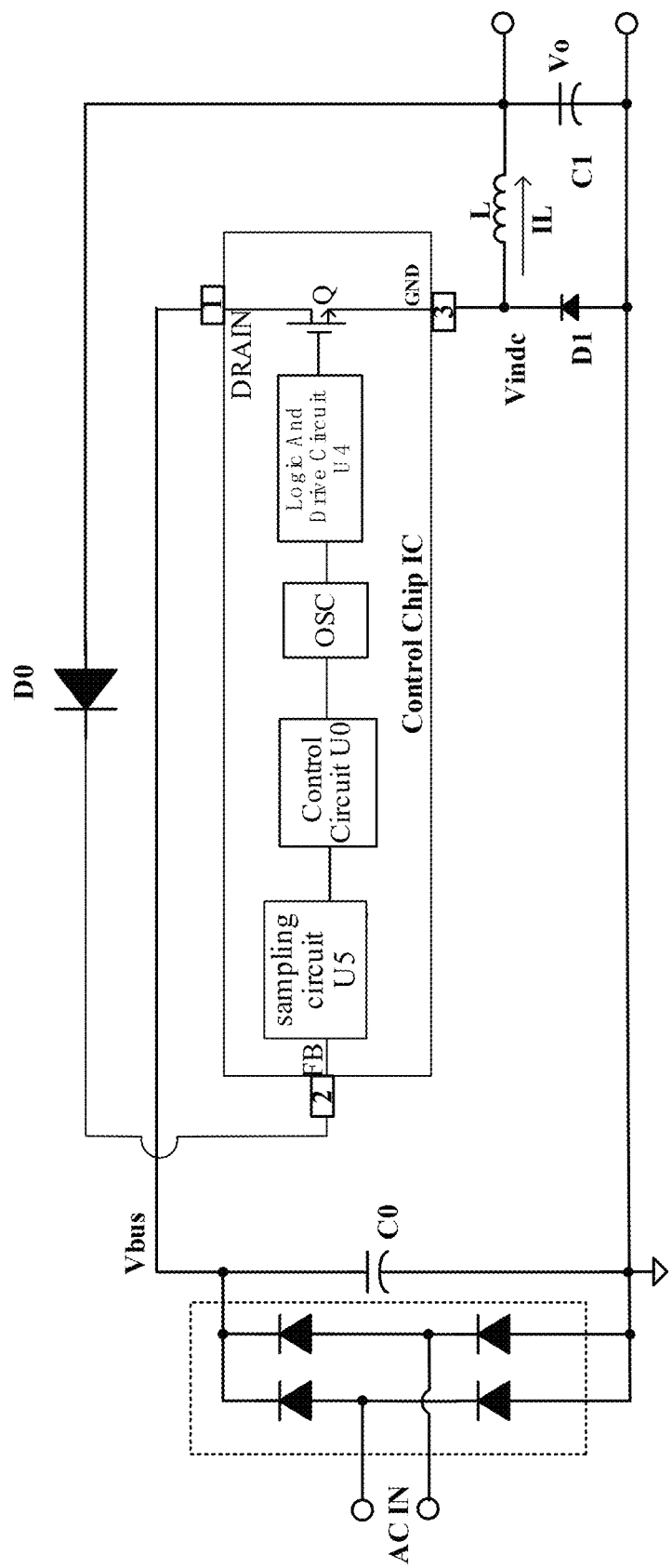
FIG. 5 is a schematic diagram showing a control chip with an integrated sampling circuit according to an embodiment of the present invention.

In this embodiment, the control chip IC has PIN1 to PIN3 and comprises a power transistor Q. PIN1 is an input pin coupled to a bus voltage Vbus and a drain DRAIN of the power transistor Q. PIN2 is a feedback pin FB coupled to an output voltage terminal of an SMPS via an associated sampling circuit. In particular, the sampling circuit may be implemented as the diode DO shown in FIG. 1. An anode of the diode is coupled to the output voltage terminal, and a cathode thereof is coupled to the feedback pin FB. PIN3 is a ground pin GND coupled to a source of the power transistor Q and the other end of the inductor L. In another embodiment, as shown in FIG. 5, the control chip IC further comprises an integrated sampling circuit U5, which is coupled to the output voltage terminal at one end and to the feedback pin FB at the other end to provide a sampled voltage Vfb required by the control circuit U0 embedded in the control chip IC. The sampled voltage Vfb can reflect variation of an output voltage Vo of the SMPS, thus enabling the control circuit U0 to adjust an operating frequency of the power transistor Q (i.e., the operating frequency f of the SMPS) and hence the SMPS's output voltage, output current, etc.

The sampling circuit may adopt any suitable circuit structure, such as the diode shown in FIG. 1, or voltage divider circuit formed by a series of resistors.

It would be appreciated that the control chip IC is not limited to having only the internal and peripheral circuit described above as an example, as it may also include any suitable necessary circuits. For example, within the control chip IC, there may be further provided a minimum on-time control circuit (not shown) for increasing a minimum on-time Tonmin of the power transistor Q with the output voltage Vo during a start-up process. In this way, when the output voltage Vo is relatively low, Tomin may be chosen to be short. Moreover, the curve of an operating frequency f vs. output voltage Vo in actual operation of the SMPS can be maintained between the first and second reference curves. As such, the problem of an accumulation of peak current value can be more readily avoided.

The control chip IC of this embodiment can be used in an SMPS of any suitable topology such as buck or boost.

In summary, the present invention provides a control method capable of switching an SMPS between operating modes based on levels of its output voltage, taking into account the requirements of an actual application of the SMPS. In this way, the SMPS's operating frequency, on-time and like can vary with the output voltage, avoiding a peak current value from accumulating to an unexpected level during start-up or under an output short circuit condition of the SMPS. This can provide protection to the SMPS's power transistor and inductor and allows them to have smaller saturation currents at the same peak current value, resulting in cost savings for the system.

The description presented above is merely that of some preferred embodiments of the present invention and is not intended to limit the scope thereof in any sense. Any and all changes and modifications made by those of ordinary skill in the art based on the above teachings fall within the scope as defined in the appended claims.

What is claimed is:

1. A control method for a switched-mode power supply, the switched-mode power supply comprising a power transistor and an inductor coupled to the power transistor, the switched-mode power supply receiving an input voltage and generating an output voltage, wherein the control method comprises:
    detecting the output voltage and comparing the output voltage with a first reference, wherein:
    i) configuring the switched-mode power supply to operate in a first operating mode when the output voltage is lower than the first reference and a difference between the output voltage and the first reference is above a threshold;
    ii) configuring the switched-mode power supply to operate in a second operating mode when the output voltage is lower than the first reference and the difference is below the threshold; and
    iii) configuring the switched-mode power supply to operate in a third operating mode when the output voltage is higher than the first reference, wherein:
    in the first operating mode, a first operating mode slope is derived from a plurality of system parameters of the switched-mode power supply, and an operating frequency of the power transistor and the output voltage are controlled to satisfy a proportional relationship according to the first operating mode slope;
    in the second operating mode, the power transistor is controlled to operate at a fixed frequency; and
    in the third operating mode, the power transistor is controlled to operate at a variable frequency.

2. The control method of claim 1, further comprising: deriving a curve of the operating frequency versus the output voltage from a first set of the system parameters of the switched-mode power supply, based on a situation where the switched-mode power supplies provide a constant output current, wherein the curve has a first slope, and wherein the first set of the system parameters includes a current variation in the power transistor, the input voltage and an inductance of the inductor.

3. The control method of claim 1, further comprising: deriving a curve of the operating frequency versus the output voltage from a second set of the system parameters of the switched-mode power supply, based on a situation where a peak current value of the switched-mode power supply is prevented from accumulating, wherein the curve has a second slope, and wherein the second set of the system parameters includes a minimum on-time of the power transistor, the input voltage and an inductance of the inductor.

4. The control method of claim 2, wherein the first operating mode slope is greater than the first slope.

5. The control method of claim 3, wherein the first operating mode slope is smaller than the second slope.

6. The control method of claim 1, further comprising: in the second operating mode, controlling the power transistor to operate at a maximum operating frequency.

7. A control circuit for a switched-mode power supply, the switched-mode power supply comprising a power transistor and an inductor coupled to the power transistor, the switched-mode power supply receiving an input voltage and generating an output voltage, wherein the control circuit comprises:
   a first control branch to receive a feedback signal reflecting the output voltage and a first reference; and a second control branch to receive the feedback signal and a second reference, wherein:
   i) when the feedback signal is higher than the first reference, the first control branch operates to enable the power transistor to operate at a variable frequency;
   ii) when the feedback signal is lower than the first reference and a difference between the feedback signal and the first reference is below a threshold, the first control branch and the second control branch operates to enable the power transistor to operate at a fixed frequency; and
   iii) when the feedback signal is lower than the first reference and the difference is above the threshold, the second control branch controls an operating frequency of the power transistor and the output voltage to satisfy a proportional relationship,
   wherein the proportional relationship is derived from a plurality of system parameters of the switched-mode power supply.

8. The control circuit of claim 7, wherein the first control branch comprises an error amplifier configured to: receive the first reference at a positive input terminal thereof;
   receive the feedback signal at a negative input terminal thereof; and output a compensation signal.

9. The control circuit of claim 8, wherein the first control branch further comprises a first transconductance amplifier coupled to the error amplifier to receive the compensation signal, and wherein the first transconductance amplifier further receives a third reference and generates a first current based on the compensation signal and the third reference.

10. The control circuit of claim 7, wherein the second control branch comprises a second transconductance amplifier configured to: receive the feedback signal and the second reference; and generate a second current based on the feedback signal and the second reference.

11. The control circuit of claim 9, further comprising a current source and a current mirror, wherein the current mirror is coupled to the current source and receives the first current, and wherein the current mirror outputs a control current which determines the operating frequency of the power transistor in the switched-mode power supply.

12. The control circuit of claim 11, wherein the control circuit controls a clock frequency based on the control current and generates a control signal based on the clock frequency, and wherein the control signal indicates an action to be taken by the power transistor and determines the operating frequency of the power transistor.

13. A control chip comprising the control circuit of claim 7.

14. The control chip of claim 13, further comprising:
   a feedback pin coupled to an output voltage terminal of the switched-mode power supply;
   an input pin coupled to a first end of the power transistor;
   a ground pin coupled to a second end of the power transistor,
   wherein the power transistor is embedded in the control chip, and wherein the power transistor is coupled to, and controlled by, the control circuit.

15. The control chip of claim 14, further comprising a sampling circuit, wherein the sampling circuit is coupled to the feedback pin and is embedded in the control chip.

16. The control chip of claim 14, wherein the control chip is connected to an external sampling circuit, wherein the external sampling circuit is coupled between the output voltage terminal of the switched-mode power supply and the feedback pin.

17. The control circuit of claim 10, further comprising a current source and a current mirror, wherein the current mirror is coupled to the current source and receives the second current, and wherein the current mirror outputs a control current which determines the operating frequency of the power transistor in the switched-mode power supply.

* * * * *